US009393596B2

(12) United States Patent
Steinmetz

(10) Patent No.: US 9,393,596 B2
(45) Date of Patent: Jul. 19, 2016

(54) METHOD FOR PRODUCING A MULTI-COAT COLOUR AND/OR EFFECT PAINT SYSTEM

(75) Inventor: Bernhard Steinmetz, Rütschenhausen (DE)

(73) Assignee: BASF Coatings GmbH, Munster (DE)

( * ) Notice: Subject to any disclaimer, the term of this patent is extended or adjusted under 35 U.S.C. 154(b) by 357 days.

(21) Appl. No.: 13/983,928

(22) PCT Filed: Jan. 6, 2012

(86) PCT No.: PCT/EP2012/050184
§ 371 (c)(1),
(2), (4) Date: Oct. 2, 2013

(87) PCT Pub. No.: WO2012/107249
PCT Pub. Date: Aug. 16, 2012

(65) Prior Publication Data
US 2015/0291838 A1 Oct. 15, 2015

Related U.S. Application Data

(60) Provisional application No. 61/440,879, filed on Feb. 9, 2011.

(30) Foreign Application Priority Data

Feb. 9, 2011 (EP) ..................................... 11153796

(51) Int. Cl.
B05D 7/00 (2006.01)
C09D 133/16 (2006.01)
C09D 175/04 (2006.01)

(52) U.S. Cl.
CPC .............. B05D 7/532 (2013.01); C09D 133/16 (2013.01); C09D 175/04 (2013.01); B05D 2202/25 (2013.01); B05D 2502/00 (2013.01); B05D 2503/00 (2013.01); B05D 2520/00 (2013.01)

(58) Field of Classification Search
None
See application file for complete search history.

(56) References Cited

U.S. PATENT DOCUMENTS

| 6,737,468 B1 * | 5/2004 | Bremser | ................ | B05D 7/532 |
| | | | | 524/431 |
| 2003/0175434 A1 * | 9/2003 | Wegner | ................ | C09D 175/04 |
| | | | | 427/385.5 |
| 2009/0087667 A1 | 4/2009 | Tomizaki et al. | | |
| 2011/0318495 A1 * | 12/2011 | Steinmetz | .............. | C09D 5/024 |
| | | | | 427/407.1 |

FOREIGN PATENT DOCUMENTS

| CN | 101396690 | 4/2009 |
| DE | 19930665 A1 | 1/2001 |
| DE | 19948004 A1 | 7/2001 |
| DE | 10043405 C1 | 6/2002 |
| EP | 0228003 A1 | 7/1987 |
| EP | 0634431 A1 | 1/1995 |
| WO | WO9215405 A1 | 9/1992 |

OTHER PUBLICATIONS

English Translation of International Preliminary Report on Patentability for International Application No. PCT/EP2012/050184 issued Aug. 13, 2013, 4 pages.
English Translation of International Search Report for International Application No. PCT/EP2012/050184 mailed Mar. 22, 2012, 2 pages.
International Search Report for International Application No. PCT/EP2012/050184 mailed Mar. 22, 2012, 4 pages.
Written Opinion for International Application No. PCT/EP2012/050184 mailed Mar. 22, 2012, 5 pages.

* cited by examiner

*Primary Examiner* — Michael P Rodriguez
(74) *Attorney, Agent, or Firm* — Servilla Whitney LLC

(57) ABSTRACT

Disclosed is a method for making multicoat color and/or effect paint systems employing a pigmented aqueous basecoat material comprising a mixture M comprised of (K1) a branched $C_{8-17}$ alkane or a mixture thereof, (K2) a branched $C_{18-25}$ alkane or a mixture thereof, and (K3) a water-miscible fluorinated polymer or a mixture thereof, where mixture M comprises 0.1% to 5% by weight, based on the weight of the aqueous basecoat material, component (K1) comprises 34% to 94% by weight, component (K2) comprises 5% to 46% by weight, and component (K3) comprises 1% to 20% by weight, all based on the weight of the mixture M, and components (K1) and (K2) have a degree of branching which corresponds to a ratio of the number of >CH— and —CH$_2$— groups to the number of —CH$_3$ groups of at least 25:75.

16 Claims, No Drawings

US 9,393,596 B2

METHOD FOR PRODUCING A MULTI-COAT COLOUR AND/OR EFFECT PAINT SYSTEM

CROSS REFERENCE TO RELATED APPLICATIONS

This application is a National Phase Application of Patent Application PCT/EP2012/050184 filed on 6 Jan. 2012, which claims priority to U.S. 61/440,879 filed 9 Feb. 2011 and EP 11153796.5 filed 9 Feb. 2011, of which all aforementioned applications are incorporated by reference herein in their entirety.

FIELD OF THE INVENTION

The invention relates to a method for producing a multicoat color and/or effect paint system by
(1) applying a pigmented aqueous basecoat material to a substrate,
(2) forming a polymer film from the coating material applied in stage (1),
(3) applying a clearcoat material to the resultant basecoat film, and then
(4) curing the basecoat film together with the clearcoat film.

BACKGROUND OF THE INVENTION

The method described above is known (cf., e.g., German patent application DE 199 48 004 A1, page 17, line 37 to page 19, line 22, or German patent DE 100 43 405 C1, column 3, paragraph [0018] and column 8, paragraph [0052] to column 9, paragraph [0057] in conjunction with column 6, paragraph [0039] to column 8, paragraph [0050]) and is widely used, for example, not only for OEM (original) finishing but also for the refinishing of automobile bodies.

The basecoat/clearcoat method in question is used in a wet-on-wet process to produce multicoat color and/or effect paint systems, which particularly in respect of the incidence of surface defects, and especially in respect of the incidence of craters, are in need of improvement. Craters in particular are often caused by contamination of the coating materials and/or coating lines with silicone oils and/or fluorinated compounds.

The object on which the present invention is based is therefore that of providing a method of the type described above with which multicoat color and/or effect paint systems are obtainable that are improved relative to the paint systems of the prior art. The paint systems are intended in particular to have very few craters, or none, caused by contamination with silicone oils and/or fluorinated compounds.

SUMMARY OF THE INVENTION

This object is surprisingly achieved by using in stage (1) of the above-described basecoat/clearcoat method a pigmented aqueous basecoat material which comprises a mixture M composed of (K1) a branched alkane having 8 to 17, preferably 10 to 17, more preferably 10 to 16 carbon atoms or a mixture of such alkanes, (K2) a branched alkane having 18 to 25, preferably 18 to 24, more preferably 18 to 22 carbon atoms or a mixture of such alkanes, and (K3) a water-miscible fluorinated polymer or a mixture of water-miscible fluorinated polymers, where
the mixture M is present in an amount of 0.1% to 5%, preferably 0.15% to 5%, more preferably 0.2% to 4.5% by weight, based on the weight of the aqueous basecoat material applied in stage (1),
component (K1) is present in an amount of 34% to 94%, preferably 34% to 89%, more preferably 34% to 84% by weight, based on the weight of the mixture M,
component (K2) is present in an amount of 5% to 46%, preferably 10% to 46%, more preferably 10% to 40% by weight, based on the weight of the mixture M,
component (K3) is present in an amount of 1% to 20%, preferably 1% to 18%, more preferably 1% to 15% by weight, based on the weight of the mixture M, and
components (K1) and (K2) have a degree of branching which corresponds to a ratio of the number of >CH— and —CH$_2$— groups to the number of —CH$_3$ groups of at least 25:75, preferably 30:70, more preferably 40:60.

The invention also relates to pigmented aqueous coating materials suitable for producing multicoat color and/or effect paint systems, and also to the use of the mixtures M for reducing surface defects, more particularly for reducing craters, in paint systems produced from aqueous pigmented coating materials.

DETAILED DESCRIPTION OF THE INVENTION

In stage (1) of the method of the invention it is possible in principle to use all known aqueous basecoat materials provided they comprise the above-defined mixture (M) in an amount of 0.1% to 5%, preferably 0.15% to 5%, more preferably 0.2% to 4.5% by weight, based on the weight of the aqueous basecoat material applied in stage (1).

Basecoat materials are said to be aqueous when they contain 30% to 70% by weight of water, based on the total weight of the basecoat material. The terms "aqueous basecoat material" and "waterborne basecoat material" are used as synonymous terms in this specification.

The basecoat materials used in accordance with the invention comprise color and/or effect pigments.

In the method of the invention it is preferred to use basecoat materials which comprise binders curable physically, thermally or both thermally and with actinic radiation. With particular preference at least one saturated or unsaturated polyurethane resin binder is present. Coating materials of this kind that comprise polyurethane resin may likewise typically be cured physically, thermally or both thermally and with actinic radiation.

In the context of the present invention the term "physical curing" denotes the formation of a film by loss of solvent from polymer solutions or polymer dispersions. Normally no crosslinking agents are needed for such curing.

In the context of the present invention the term "thermal curing" denotes the heat-initiated crosslinking of a coating film for which either a separate crosslinking agent and/or self-crosslinking binders are employed. The crosslinking agent comprises reactive functional groups which are complementary to the reactive functional groups present in the binders. This is typically referred to by those in the art as external crosslinking. Where the complementary reactive functional groups or autoreactive functional groups, i.e., groups which react "with themselves", are already present in the binder molecules, the binders are self-crosslinking. Examples of suitable complementary reactive functional groups and autoreactive functional groups are known from German patent application DE 199 30 665 A1, page 7 line 28 to page 9 line 24.

In the context of the present invention, actinic radiation is understood to encompass electromagnetic radiation such as near infrared (NIR), visible light, UV radiation, X-rays or γ radiation, more particularly UV radiation, and particulate radiation such as electron beams, beta radiation, alpha radiation, proton beams or neutron beams, more particularly electron beams. Curing by UV radiation is typically initiated by free-radical or cationic photoinitiators.

Where thermal curing and curing with actinic light are employed jointly, the term "dual cure" is also used.

The present invention prefers basecoat materials which are curable thermally or both thermally and with actinic radiation, in other words by means of dual cure. Preference is given more particularly to those basecoat materials whose binder is a polyurethane resin and whose crosslinking agent is an amino resin or a blocked or nonblocked polyisocyanate. Among the amino resins, melamine resins are preferred more particularly.

Suitable saturated or unsaturated polyurethane resins are described for example in
  German patent application DE 199 11 498 A1, column 1 lines 29 to 49 and column 4 line 23 to column 11 line 5,
  German patent application DE 199 48 004 A1, page 4 line 19 to page 13 line 48,
  European patent application EP 0 228 003 A1, page 3 line 24 to page 5 line 40,
  European patent application EP 0 634 431 A1, page 3 line 38 to page 8 line 9, or
  international patent application WO 92/15405, page 2 line 35 to page 10 line 32.

The polyurethane resins preferably contain, for stabilization, alternatively
  functional groups which can be converted by neutralizing agents and/or quaternizing agents into cations, and/or cationic groups, or
  functional groups which can be converted by neutralizing agents into anions, and/or anionic groups, and/or
  nonionic hydrophilic groups.

The polyurethane resins are linear or contain branching points. They may also take the form of graft copolymers. In that case they are grafted preferably with polyacrylate resins.

Graft copolymers of this kind are well known to the skilled worker and are described for example in DE 199 48 004 A1.

When the basecoat materials that are preferably used take the form of self-crosslinking systems, the polyurethane resin content is 50% to 100%, preferably 50% to 90%, and more preferably 50% to 80%, by weight, based on the film-forming solids of the basecoat material.

By film-forming solids is meant the nonvolatile weight fraction of the coating material, without pigments and/or fillers, that is left as a residue after two hours of drying at 120° C.

In the case of externally crosslinking systems, the polyurethane resin content is between 10% and 80%, preferably between 15% and 75%, and more preferably between 20% and 70%, by weight, based in each case on the film-forming solids of the basecoat material.

It is essential to the invention that the aqueous basecoat materials used in stage (1) of the method of the invention comprise a mixture M composed of (K1) a branched alkane having 8 to 17, preferably 10 to 17, more preferably 10 to 16 carbon atoms or a mixture of such alkanes, (K2) a branched alkane having 18 to 25, preferably 18 to 24, more preferably 18 to 22 carbon atoms or a mixture of such alkanes, and (K3) a water-miscible fluorinated polymer or a mixture of water-miscible fluorinated polymers, where
  the mixture M is present in an amount of 0.1% to 5%, preferably 0.15% to 5%, more preferably 0.2% to 4.5% by weight, based on the weight of the aqueous basecoat material applied in stage (1),
  component (K1) is present in an amount of 34% to 94%, preferably 34% to 89%, more preferably 34% to 84% by weight, based on the weight of the mixture M,
  component (K2) is present in an amount of 5% to 46%, preferably 10% to 46%, more preferably 10% to 40% by weight, based on the weight of the mixture M,
  component (K3) is present in an amount of 1% to 20%, preferably 1% to 18%, more preferably 1% to 15% by weight, based on the weight of the mixture M, and
  components (K1) and (K2) have a degree of branching which corresponds to a ratio of the number of >CH— and —$CH_2$— groups to the number of —$CH_3$ groups of at least 25:75, preferably 30:70, more preferably 40:60.

If the amount of the mixtures used in accordance with the invention is below 0.1% by weight, the object on which the invention is based is not achieved. If the amount is more than 5% by weight, it may be necessary in certain circumstances to accept disadvantages, such as a deterioration of adhesion in unbaked paint systems, for example.

As component (K1) use is made of branched alkanes having 8 to 17, preferably 10 to 17, more preferably 10 to 16 carbon atoms, or mixtures of such alkanes. The alkanes used as component (K1) have a degree of branching which corresponds to a ratio of the number of >CH— and —$CH_2$— groups to the number of —$CH_3$ groups of at least 25:75, preferably 30:70, more preferably 40:60. The degree of branching of the alkanes used as component (K1) may be determined by means of $^1$H-NMR spectroscopy.

As component (K1) it is possible to use the octane, nonane, decane, undecane, dodecane, tridecane, tetradecane, pentadecane, hexadecane, and heptadecane isomers that have the degree of branching indicated above, and also mixtures of octane and/or nonane and/or decane and/or undecane and/or dodecane and/or tridecane and/or tetradecane and/or pentadecane and/or hexadecane and/or heptadecane isomers which have the degree of branching indicated above.

As component (K1) it is preferred to use alkane mixtures which are available under the brand name Isopar L (Exxon Mobil).

As component (K2) use is made of branched alkanes having 18 to 25, preferably 18 to 24, more preferably 18 to 22 carbon atoms, or mixtures of such alkanes. The alkanes used as component (K2) have a degree of branching which corresponds to a ratio of the number of >CH— and —$CH_2$— groups to the number of —$CH_3$ groups of at least 25:75, preferably 30:70, more preferably 40:60. The degree of branching of the alkanes used as component (K2) may be determined by means of $^1$H-NMR spectroscopy.

As component (K2) it is possible to use the octadecane, nonadecane, eicosane, heneicosane, docosane, tricosane, tetracosane, and pentacosane isomers that have the degree of branching indicated above, and also mixtures of octadecane and/or nonadecane and/or eicosane and/or heneicosane and/or docosane and/or tricosane and/or tetracosane and/or pentacosane isomers which have the degree of branching indicated above.

As component (K2) it is preferred to use alkane mixtures which are available under the brand name Isopar V (Exxon Mobil).

As component (K3) a water-miscible fluorinated polymer or a mixture of water-miscible fluorinated polymers is used. By fluorinated polymers are meant polymers which contain perfluorinated alkyl groups having 2 to 10, preferably 2 to 8, more preferably 3 to 8 carbon atoms.

As component (K3) it is preferred to use water-miscible poly(meth)acrylate resins which have a weight-average molecular weight of 500 to 100 000, preferably 1000 to 90

000, more preferably 2000 to 75 000 daltons as measured by means of gel permeation chromatography against a polystyrene standard in accordance with DIN 55672-1 to 3 and which are preparable by polymerization of (a) 1% to 50%, preferably 2% to 40%, more preferably 4% to 35% by weight of an ethylenically unsaturated monomer which contains a perfluorinated alkyl group having 2 to 10, preferably 2 to 8, more preferably 3 to 8 carbon atoms, or a mixture of such monomers, (b) 0.1% to 30%, preferably 0.5% to 25%, more preferably 1% to 20% by weight of an ethylenically unsaturated monomer which contains at least one hydrophilic group, or a mixture of such monomers, (c) 49.9% to 89.9%, preferably 59.5% to 79.5%, more preferably 54% to 64% by weight of an aliphatic, cycloaliphatic or aromatic, preferably an aliphatic or cycloaliphatic, more preferably an aliphatic methacrylic or acrylic ester or a mixture of such esters, and (d) 0% to 40%, preferably 0% to 30%, more preferably 0% to 20% by weight of an ethylenically unsaturated monomer different from (a), (b), and (c), or a mixture of such monomers.

Examples of ethylenically unsaturated monomers which contain a perfluorinated alkyl group having 4 to 10, preferably 5 to 9, more preferably 6 to 8 carbon atoms are perfluorobutyl acrylate, perfluorobutyl methacrylate, perfluoropentyl acrylate, perfluoropentyl methacrylate, perfluorohexyl acrylate, perfluorohexyl methacrylate, perfluoroheptyl acrylate, perfluoroheptyl methacrylate, perfluorooctyl acrylate, perfluorooctyl methacrylate, perfluorononyl acrylate, perfluorononyl methacrylate, perfluorodecyl acrylate and perfluorodecyl methacrylate.

The ethylenically unsaturated monomers which can be used as component (b) may comprise, for example, polyoxyethylene groups, polyoxypropylene groups, carboxyl groups, carboxylate group, sulfonic acid groups or sulfonate groups as hydrophilic groups.

Examples of suitable monomers include hydroxypolyethylene glycol acrylates, hydroxypolyethylene glycol methacrylates, hydroxypolypropylene glycol acrylates, hydroxypolypropylene glycol methacrylates, and their alkoxy derivatives, and also acrylic acid and methacrylic acid. As component (b) it is preferred to use monomers contain acid groups, more preferably acrylic acid and/or methacrylic acid, in an amount such that the fluorinated polymers have an acid number of 20-300, preferably 30 to 250, more preferably 30 to 200 mg KOH/g.

For the aliphatic, cycloaliphatic or aromatic methacrylic and acrylic esters which can be used as component (c), mention may be made by way of example of methyl methacrylate, methyl acrylate, ethyl methacrylate, hydroxyethyl methacrylate, ethyl acrylate, hydroxyethyl acrylate, propyl methacrylate, hydroxypropyl methacrylate, propyl acrylate, hydroxypropyl acrylate, n-butyl acrylate, isobutyl acrylate, hydroxybutyl acrylate, n-butyl methacrylate, isobutyl methacrylate, hydroxybutyl methacrylate, cyclohexyl methacrylate, cyclohexyl acrylate, phenyl methacrylate, and phenyl acrylate.

Examples of ethylenically unsaturated monomers different from (a), (b), and (c) that may be used include cycloalkyl vinyl ethers such as cyclohexyl vinyl ether, cycloalkyl allyl ethers such as cyclohexyl allyl ether, alkyl vinyl ethers such as ethyl vinyl ether, propyl vinyl ether, and butyl vinyl ether, alkyl allyl ethers such as ethyl allyl ether, propyl allyl ether, and butyl allyl ether, hydroxyalkyl vinyl ethers such as hydroxyethyl vinyl ether, hydroxypropyl vinyl ether, and hydroxybutyl vinyl ether, hydroxyalkyl allyl ethers such as hydroxyethyl allyl ether, hydroxypropyl allyl ether, and hydroxybutyl allyl ether, vinyl esters such as butyl vinyl ester, acrylamide, methacrylamide, and styrene.

The mixtures M used in accordance with the invention comprise as component (K3) with particular preference a fluorinated polymer which has a weight-average molecular weight of 1000 to 90 000, preferably 2000 to 75 000 daltons, as measured by means of gel permeation chromatography against a polystyrene standard in accordance with DIN 55672-1 to 3, and an acid number of 100 to 140, preferably 110 to 130, mg KOH/g, and which comprises as copolymerized monomers n-butyl acrylate, isobutyl acrylate, n-butyl methacrylate, perfluoroheptyl acrylate and/or perfluoroheptyl methacrylate, and also acrylic and/or methacrylic acid. Polymers of this kind are available commercially under the brand name EFKA 3772 from BASF SE.

The basecoat materials used in accordance with the invention may further comprise at least one additive. Examples of such additives are salts which can be decomposed thermally without residue, or substantially without residue, crosslinking agents such as the aforementioned amino resins and blocked or nonblocked polyisocyanates, organic solvents, reactive diluents, transparent pigments, fillers, molecularly dispersely soluble dyes, nanoparticles, light stabilizers, antioxidants, deaerating agents, emulsifiers, slip additives, polymerization inhibitors, free-radical polymerization initiators, adhesion promoters, flow control agents, film-forming assistants, sag control agents (SCAs), flame retardants, corrosion inhibitors, waxes, siccatives, biocides, matting agents, and thickeners. Suitable thickeners include inorganic thickeners from the group of the phyllosilicates. Besides the inorganic thickeners, however, it is also possible to use one or more organic thickeners. These are preferably selected from the group consisting of (meth)acrylic acid-(meth)acrylate copolymer thickeners, such as the commercial product Viscalex HV30 (Ciba, BASF), for example, and polyurethane thickeners, such as the commercial product DSX® 1550 from Cognis, for example. (Meth)acrylic acid-(meth)acrylate copolymer thickeners are those which in addition to acrylic acid and/or methacrylic acid also comprise in copolymerized form one or more acrylic esters (i.e., acrylates) and/or one or more methacrylic esters (i.e., methacrylates). A feature common to the (meth)acrylic acid-(meth)acrylate copolymer thickeners is that in alkaline medium, in other words at pH levels >7, more particularly >7.5, they exhibit a sharp rise in viscosity as a result of formation of salts of the acrylic and/or methacrylic acid, in other words by the formation of carboxylate groups. Where (meth)acrylic esters are used that are formed from (meth)acrylic acid and a $C_1$-$C_6$ alkanol, the resulting thickeners are (meth)acrylic acid-(meth)acrylate copolymer thickeners that have a substantially nonassociative action, such as the aforementioned Viscalex HV30, for example. (Meth)acrylic acid-(meth)acrylate copolymer thickeners having a substantially nonassociative action are also referred to in the literature as ASE thickeners (for Alkali Soluble/Swellable Emulsion or dispersion). As (meth)acrylic acid-(meth)acrylate copolymer thickeners it is also possible, however, to use those known as EASE thickeners (Hydrophobically modified Anionic Soluble Emulsions or dispersions). These are obtained by using, instead of or in addition to the $C_1$-$C_6$ alkanols, alkanols having a larger number of carbon atoms, 7 to 30 for example, or 8 to 20 carbon atoms. The thickening action of EASE thickeners is substantially associative. The (meth)acrylic acid-(meth)acrylate copolymer thickeners that can be used are not suitable as binder resins, on account of their thickening properties; accordingly, they are not included among the binders that are curable physically, thermally or both thermally and actinically, and are therefore explicitly different to the poly(meth)acrylate-based binders that can be used in the basecoat compositions of the invention.

Polyurethane thickeners are the thickeners with an associative action that are referred to in the literature as HEUR (Hydrophobically modified Ethylene oxide Urethane Rheology modifiers). In chemical terms these are nonionic, branched or unbranched block copolymers comprising polyethylene oxide chains (in some cases polypropylene oxide chains as well) which are linked to one another via urethane bonds and which carry terminal, long-chain alkyl or alkenyl groups having 8 to 30 carbon atoms. Examples of typical alkyl groups are dodecyl or stearyl groups; an example of a typical alkenyl group is an oleyl group; a typical aryl group is the phenyl group; and an example of a typical alkylated aryl group is a nonylphenyl group. On account of their thickening properties and structure, the polyurethane thickeners are unsuited to the binder resins curable physically, thermally or both thermally and physically. They are therefore explicitly different from the polyurethanes which can be used as binders in the basecoat compositions of the invention.

Suitable additives of the aforementioned kind are known for example from

German patent application DE 199 48 004 A1, page 14 line 4 to page 17 line 5 and German patent DE 100 43 405 C1, column 5, paragraphs [0031] to [0033].

They are used in the typical and known amounts.

The solids content of the basecoat materials used in accordance with the invention may vary in accordance with the requirements of the case in hand. The solids content is guided primarily by the viscosity that is required for application, especially spray application, and so can be adjusted by the skilled worker on the basis of his or her general art knowledge, where appropriate with assistance from a few rangefinding tests.

The solids content of the basecoat materials is preferably 5% to 70%, more preferably 10% to 65%, and with particular preference 15% to 60% by weight.

By solids content is meant that weight fraction which is left as a residue on evaporation under defined conditions. In the present specification, the solids content has been determined in accordance with DIN EN ISO 3251. The measurement time was 60 minutes at 125° C.

The basecoat materials used in accordance with the invention can be produced using the mixing assemblies and mixing methods that are typical and known for the production of basecoat materials.

The basecoat materials of the invention may be employed as one-component (1K), two-component (2K) or multicomponent (3K, 4K) systems.

In one-component (1K) systems, binder and crosslinking agent are present alongside one another, i.e., in one component. A prerequisite for this is that the two constituents crosslink with one another only at relatively high temperatures and/or on exposure to actinic radiation.

In two-component (2K) systems, binder and crosslinking agent are present separately from one another in at least two components, which are not combined until shortly before application. This form is selected when binder and crosslinking agent react with one another even at room temperature. Coating materials of this kind are employed in particular for coating thermally sensitive substrates, especially in automotive refinishing.

With the aid of the method of the invention it is possible to coat metallic and nonmetallic substrates, more particularly plastics substrates, preferably automobile bodies or parts thereof.

The invention also provides for the use of the above-described mixture M for increasing the pinholing limit and/or for reducing surface defects in aqueous pigmented coating materials.

The invention is elucidated below, using examples.

EXAMPLES

1. Preparation of a Black Waterborne Basecoat Material 1

The components listed in table A under "aqueous phase" are stirred together in the stated order to form an aqueous mixture. In the next step, an organic mixture is prepared from the components listed under "organic phase". The organic mixture is added to the aqueous mixture. The combined mixture is then stirred for 10 minutes and is adjusted using deionized water and dimethylethanolamine to a pH of 8 and a spray viscosity of 58 mPas under a shearing load of 1000/sec, as measured using a rotational viscometer (Rheomat RM 180 instrument from Mettler-Toledo) at 23° C.

TABLE A

| Component | Parts by weight |
|---|---|
| Aqueous phase | |
| 3% strength Na Mg phyllosilicate solution | 12.1 |
| Deionized water | 5.2 |
| Polyurethane dispersion, prepared as per example c, column 16 lines 10-35 of DE-A-4009858 | 15.6 |
| Polyester; prepared as per example D, column 16 lines 37-59 of DE-A-4009858 | 6.6 |
| Luwipal 052, melamine-formaldehyde resin (BASF) | 4.9 |
| Butylglycol | 7.1 |
| Butyldiglycol | 1.2 |
| Tensid S (BASF), surfactant | 2.1 |
| 10% strength dimethylethanolamine in water | 0.9 |
| Polyurethane acrylate; prepared as per page 7 line 55 - page 8 line 23 of DE-A-4437535 | 3.3 |
| Deionized water | 2.7 |
| 3% strength by weight aqueous Viscalex HV 30 solution; rheological agent, available from BASF, in water | 7.8 |
| Deionized water | 5.9 |
| Triethylene glycol (BASF) | 1.7 |
| Mixture of 10 parts of a commercial carbon black pigment (Cabot), 57 parts of the above-described polyurethane dispersion, 2.5 parts of Pluriol P 900 (BASF), 7 parts of butylglycol, and 23.5 parts of deionized water | 3.6 |
| Mixture of 12.5 parts of a commercial carbon black pigment (BASF), 69.8 parts of the above-described polyurethane dispersion, 1.2 parts of Pluriol P 900 (BASF), 7 parts of butylglycol, and 16.5 parts of deionized water | 6.2 |
| Deionized water | 2.2 |
| Mixture of 2.7 parts Viscalex HV 30 (BASF), 7 parts of Tensid S (BASF), 2 parts of 10% strength dimethylethanolamine in water, and 88.3 parts of deionized water | 3 |
| Commercial pearlescent pigment (Merck) | 1 |
| Deionized water | 7.2 |

TABLE A-continued

| Component | Parts by weight |
|---|---|
| Organic Phase | |
| Commercial aluminum pigment available from Altana-Eckart | 0.1 |
| Butylglycol | 0.2 |
| Polyester; prepared as per example D, column 16 lines 37-59 of DE-A-4009858 | 0.4 |

2. Preparation of Contaminated Waterborne Basecoat Materials

Waterborne Basecoat Material C-1

Waterborne basecoat material 1 was admixed with 0.1 ppm of Wacker AK 1000 silicone oil.

Waterborne Basecoat Material C-2

Waterborne basecoat material 1 was admixed with 0.5 ppm of Wacker AK 100 000 silicone oil.

Waterborne Basecoat Material C-3

Waterborne basecoat material 1 was admixed with 0.1 ppm of a fluorinated flow control assistant (Byk-066N).

3. Preparation of Inventive Waterborne Basecoat Materials

Waterborne Basecoat Material I1

The inventive waterborne basecoat material I1 was prepared by admixing 100 parts by weight of waterborne basecoat material C-1 with 2 parts by weight of a mixture of 6.25% by weight EFKA-3772 (BASF), 31.25% by weight Isopar V, and 62.5% by weight Isopar L.

Waterborne Basecoat Material I2

The inventive waterborne basecoat material I2 was prepared by admixing 100 parts by weight of waterborne basecoat material C-2 with 2 parts by weight of a mixture of 6.25% by weight EFKA-3772 (BASF), 31.25% by weight Isopar V, and 62.5% by weight Isopar L.

Waterborne Basecoat Material I3

The inventive waterborne basecoat material I3 was prepared by admixing 100 parts by weight of waterborne basecoat material C-3 with 2 parts by weight of a mixture of 6.25% by weight EFKA-3772 (BASF), 31.25% by weight Isopar V, and 62.5% by weight Isopar L.

4. Application of the Waterborne Basecoat Materials and Evaluation of the Multicoat Paint Systems Obtained The basecoat materials were applied to aluminum panels with dimensions of 40×40 cm in a film thickness of 8-12 μm. After drying of the basecoat films (10 minutes at 80° C.), the dried waterborne basecoat film was overcoated with a commercial two-component clearcoat material. The waterborne basecoat film and clearcoat film were then cured in a forced-air oven at 140° C. for 20 minutes. The number of craters in the multicoat paint system was determined visually. The experimental results can be taken from the table below:

TABLE B

Craters in the multicoat paint systems of waterborne basecoat materials 1, C-1 to C-3, and I1 to I3

| WBM | Sum of the craters on 3 panels | Assessment |
|---|---|---|
| 1 | 0 | OK |
| C-1 | 21 | nOK |
| I1 | 1 | OK |
| C-2 | 18 | nOK |
| I2 | 4 | OK |
| C-3 | 16 | nOK |
| I3 | 3 | OK |

The results show that the inventive use of the mixtures M significantly lowers the crater count.

What is claimed is:

1. A method for producing a multicoat color and/or effect painting system by:
   (1) applying a pigmented aqueous basecoat material to a substrate,
   (2) forming a basecoat film from the pigmented aqueous basecoat material applied in stage (1),
   (3) applying a clearcoat material to the basecoat film to form a clearcoat film, and then
   (4) curing the basecoat film together with the clearcoat film,
wherein the pigmented aqueous basecoat material comprises a mixture M comprising:
   (K1) a branched alkane having 8 to 17 carbon atoms or a mixture of such alkanes,
   (K2) a branched alkane having 18 to 25 carbon atoms or a mixture of such alkanes, and
   (K3) a water-miscible fluorinated polymer or a mixture of water-miscible fluorinated polymers, wherein
      the mixture M is present in an amount of 0.1% to 5% by weight, based on the weight of the aqueous basecoat material applied in stage (1),
      component (K1) is present in an amount of 34% to 94% by weight, based on the weight of the mixture M,
      component (K2) is present in an amount of 5% to 46% by weight, based on the weight of the mixture M,
      component (K3) is present in an amount of 1% to 20% by weight, based on the weight of the mixture M, and
      components (K1) and (K2) have a degree of branching which corresponds to a ratio of the number of >CH— and —CH$_2$— groups to the number of —CH$_3$ groups of at least 25:75.

2. The method of claim 1, wherein component (K3) comprises a water-miscible poly(meth)acrylate resin having a weight-average molecular weight of 500 to 100 000 daltons as measured by means of gel permeation chromatography against a polystyrene standard in accordance with DIN 55672-1 to 3 and which is prepared by polymerization of:
   (a) 1% to 50% by weight of an ethylenically unsaturated monomer comprising a perfluorinated alkyl group having 2 to 10 carbon atoms, or a mixture of such monomers,
   (b) 0.1% to 30% by weight of an ethylenically unsaturated monomer comprising at least one hydrophilic group, or a mixture of such monomers, (c) 49.9% to 89.9% by weight of one or more esters selected from the group consisting of: an aliphatic ester, a cycloaliphatic ester or an aromatic ester, or a mixture of such esters, and (d) 0% to 40% by weight of an ethylenically unsaturated monomer different from (a), (b), and (c).

3. The method of claim 1, wherein the water-miscible poly(meth)acrylate resin used comprises acid groups and has an acid number of 20 to 300 mg KOH/g.

4. The method of claim 1, wherein the mixture M is present in an amount of 0.2% to 4.5%, by weight, based on the weight of the aqueous basecoat material applied in stage (1).

5. The method of claim 1, wherein the pigmented aqueous basecoat material used in stage (1) further comprises as binder at least one saturated or unsaturated polyurethane resin.

6. The method of claim 1, wherein the pigmented aqueous basecoat material used in stage (1) further comprises at least one crosslinking agent selected from the group consisting of amino resins and blocked or nonblocked polyisocyanates.

7. A pigmented aqueous coating material comprising:
a mixture M comprising:
(K1) a branched alkane having 8 to 17 carbon atoms or a mixture of such alkanes,
(K2) a branched alkane having 18 to 25 carbon atoms or a mixture of such alkanes, and
(K3) a water-miscible fluorinated polymer or a mixture of water-miscible fluorinated polymers, wherein
the mixture M is present in an amount of 0.1% to 5% by weight, based on the weight of the aqueous basecoat material,
component (K1) is present in an amount of 34% to 94% by weight, based on the weight of the mixture M,
component (K2) is present in an amount of 5% to 46% by weight, based on the weight of the mixture M,
component (K3) is present in an amount of 1% to 20% by weight, based on the weight of the mixture M, and
components (K1) and (K2) have a degree of branching which corresponds to a ratio of the number of >CH— and —CH$_2$— groups to the number of —CH$_3$ groups of at least 25:75.

8. A method for reducing surface defects in paint systems produced from aqueous pigmented coating materials, the method comprising:
incorporating into an aqueous pigmented coating material a mixture (M), the mixture M comprising:
(K1) a branched alkane having 8 to 17 carbon atoms or a mixture of such alkanes,
(K2) a branched alkane having 18 to 25 carbon atoms or a mixture of such alkanes, and
(K3) a water-miscible fluorinated polymer or a mixture of water-miscible fluorinated polymers, wherein
component (K1) is present in an amount of 34% to 94% by weight, based on the weight of the mixture M,
component (K2) is present in an amount of 5% to 46% by weight, based on the weight of the mixture M,
component (K3) is present in an amount of 1% to 20% by weight, based on the weight of the mixture M, and
components (K1) and (K2) have a degree of branching which corresponds to a ratio of the number of >CH— and —CH$_2$— groups to the number of —CH$_3$ groups of at least 25:75; and
applying the aqueous pigmented coating material to a substrate.

9. The method of claim 1, wherein mixture M comprises:
(K1) a branched alkane having 10 to 17 carbon atoms or a mixture of such alkanes,
(K2) a branched alkane having 18 to 24 carbon atoms or a mixture of such alkanes, and
(K3) a water-miscible fluorinated polymer or a mixture of water-miscible fluorinated polymers, wherein
component (K1) is present in an amount of 34% to 89% by weight, based on the weight of the mixture M,
component (K2) is present in an amount of 10% to 46% by weight, based on the weight of the mixture M,
component (K3) is present in an amount of 1% to 18% by weight, based on the weight of the mixture M, and
components (K1) and (K2) have a degree of branching which corresponds to a ratio of the number of >CH— and —CH$_2$— groups to the number of —CH$_3$ groups of at least 30:70.

10. The method of claim 9, wherein mixture M comprises:
(K1) a branched alkane having 10 to 16 carbon atoms or a mixture of such alkanes,
(K2) a branched alkane having 18 to 22 carbon atoms or a mixture of such alkanes, and
(K3) a water-miscible fluorinated polymer or a mixture of water-miscible fluorinated polymers, wherein
component (K1) is present in an amount of 34% to 84% by weight, based on the weight of the mixture M,
component (K2) is present in an amount of 10% to 40% by weight, based on the weight of the mixture M,
component (K3) is present in an amount of 1% to 15% by weight, based on the weight of the mixture M, and
components (K1) and (K2) have a degree of branching which corresponds to a ratio of the number of >CH— and —CH$_2$— groups to the number of —CH$_3$ groups of at least 40:60.

11. The method of claim 2, wherein component (K3) comprises a water-miscible poly(meth)acrylate resin having a weight-average molecular weight of 1000 to 90 000 daltons as measured by means of gel permeation chromatography against a polystyrene standard in accordance with DIN 55672-1 to 3 and which is prepared by polymerization of:
(a) 2% to 40% by weight of an ethylenically unsaturated monomer which contains a perfluorinated alkyl group having 2 to 8 carbon atoms, or a mixture of such monomers,
(b) 0.5% to 25% by weight of an ethylenically unsaturated monomer which contains at least one hydrophilic group, or a mixture of such monomers,
(c) 59.5% to 79.5% by weight of an aliphatic a cycloaliphatic ester or a mixture of such esters, and
(d) 0% to 30% by weight of an ethylenically unsaturated monomer different from (a), (b), and (c).

12. The method of claim 11, wherein component (K3) comprises a water-miscible poly(meth)acrylate resin having a weight-average molecular weight of 2000 to 75 000 daltons as measured by means of gel permeation chromatography against a polystyrene standard in accordance with DIN 55672-1 to 3 and which is prepared by polymerization of:
(a) 4% to 35% by weight of an ethylenically unsaturated monomer which contains a perfluorinated alkyl group having 3 to 8 carbon atoms, or a mixture of such monomers,
(b) 1% to 20% by weight of an ethylenically unsaturated monomer which contains at least one hydrophilic group, or a mixture of such monomers,
(c) 54% to 64% by weight of an aliphatic methacrylic or acrylic ester or a mixture of such esters, and (d) 0% to 20% by weight of an ethylenically unsaturated monomer different from (a), (b), and (c).

13. The method of claim 3, wherein the poly(meth)acrylate resin used as component (K3) has an acid number of 30 to 250 mg KOH/g.

14. The method of claim 13, wherein the poly(meth)acrylate resin used as component (K3) has an acid number of 30 to 200 mg KOH/g.

15. The pigmented aqueous coating material of claim 7, wherein mixture M comprises:
   (K1) a branched alkane having 10 to 17 carbon atoms or a mixture of such alkanes,
   (K2) a branched alkane having 18 to 24 carbon atoms or a mixture of such alkanes, and
   (K3) a water-miscible fluorinated polymer or a mixture of water-miscible fluorinated polymers, wherein
      component (K1) is present in an amount of 34% to 89% by weight, based on the weight of the mixture M,
      component (K2) is present in an amount of 10% to 46% by weight, based on the weight of the mixture M,
      component (K3) is present in an amount of 1% to 18% by weight, based on the weight of the mixture M, and
      components (K1) and (K2) have a degree of branching which corresponds to a ratio of the number of >CH— and —CH$_2$— groups to the number of —CH$_3$ groups of at least 30:70.

16. The pigmented aqueous coating material of claim 15, wherein mixture M comprises:
   (K1) a branched alkane having 10 to 16 carbon atoms or a mixture of such alkanes,
   (K2) a branched alkane having 18 to 22 carbon atoms or a mixture of such alkanes, and
   (K3) a water-miscible fluorinated polymer or a mixture of water-miscible fluorinated polymers, wherein:
      component (K1) is present in an amount of 34% to 84% by weight, based on the weight of the mixture M,
      component (K2) is present in an amount of 10% to 40% by weight, based on the weight of the mixture M,
      component (K3) is present in an amount of 1% to 15% by weight, based on the weight of the mixture M, and
      components (K1) and (K2) have a degree of branching which corresponds to a ratio of the number of >CH— and —CH$_2$— groups to the number of —CH$_3$ groups of at least 40:60.

* * * * *